Nov. 24, 1959   C. W. MacMILLAN   2,913,825
HEADLIGHT AIM TESTING DEVICE
Filed April 26, 1956   3 Sheets-Sheet 1
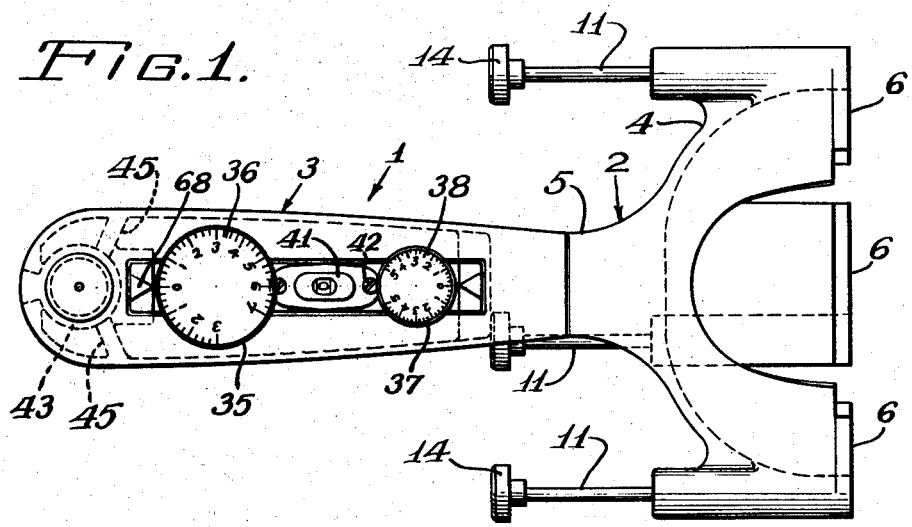
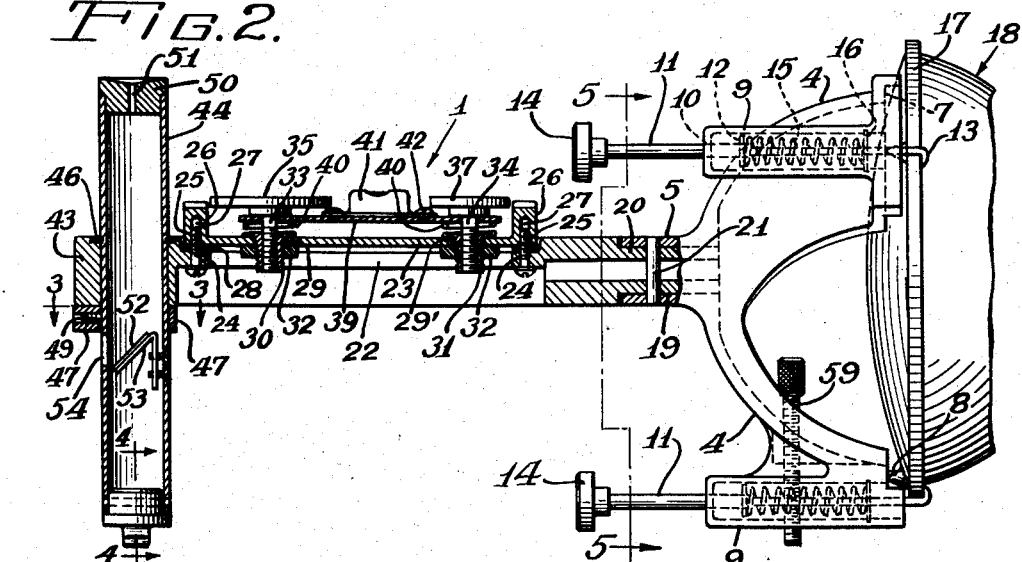
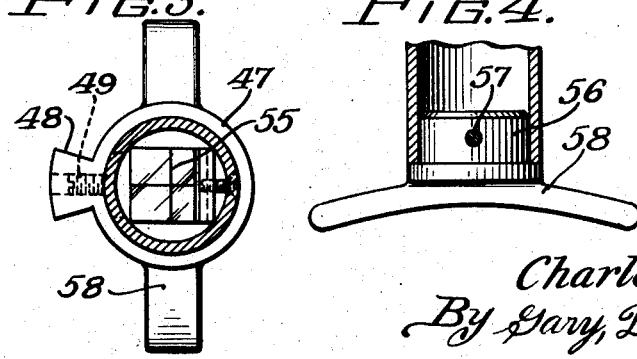
Inventor:
Charles W. MacMillan
By Gary, Desmond & Parker
Attys.

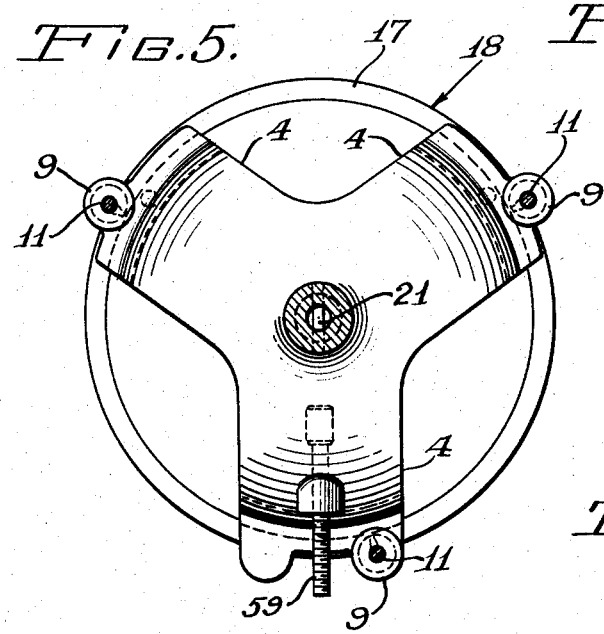
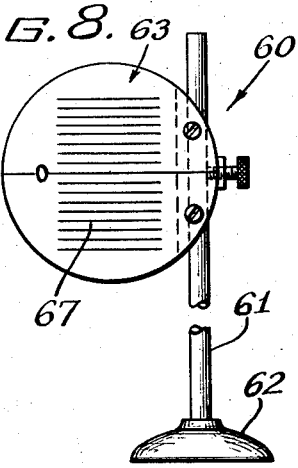
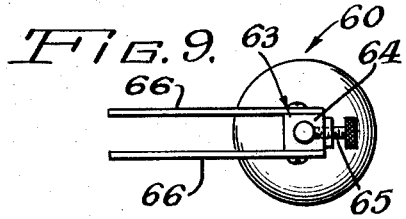
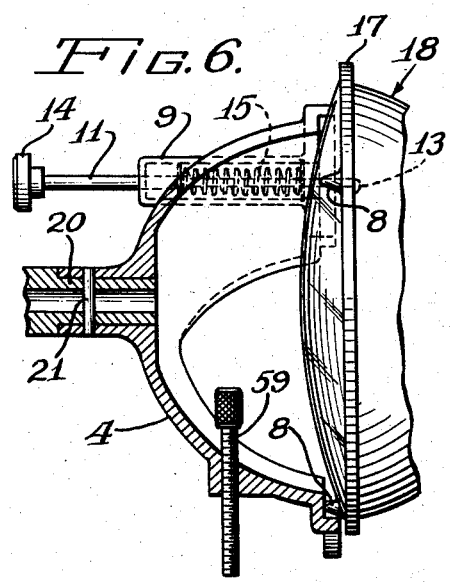
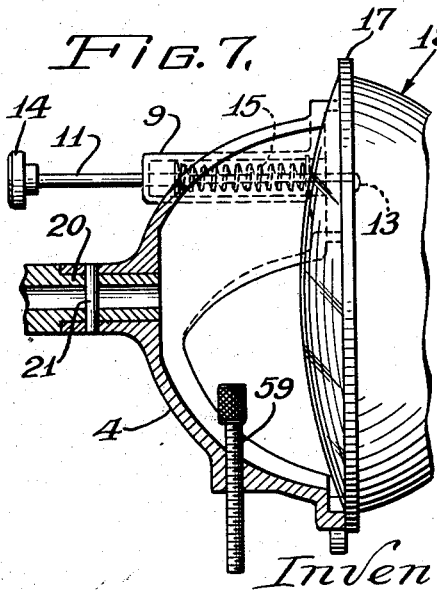

Nov. 24, 1959     C. W. MacMILLAN     2,913,825
HEADLIGHT AIM TESTING DEVICE
Filed April 26, 1956     3 Sheets-Sheet 3
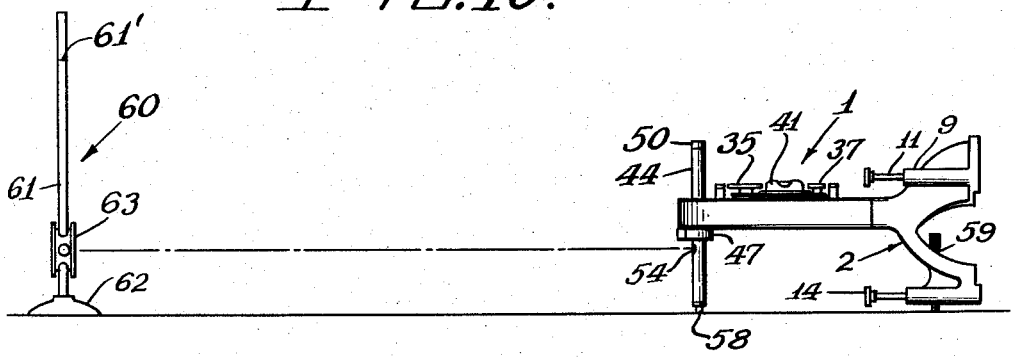
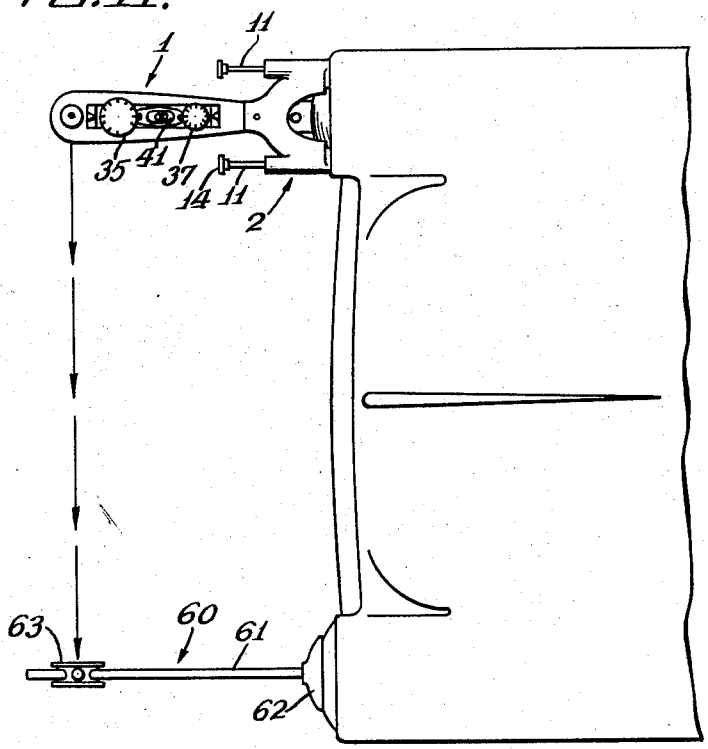
Inventor:
Charles W. MacMillan
By Gary, Desmond & Parker
Attys.

United States Patent Office 2,913,825
Patented Nov. 24, 1959

2,913,825
HEADLIGHT AIM TESTING DEVICE

Charles W. MacMillan, Rock Island, Ill., assignor to Bear Manufacturing Company, Rock Island, Ill., a corporation of Delaware Application April 26, 1956, Serial No. 580,791

3 Claims. (Cl. 33—46)

This invention relates to improvements in an aiming device for properly orienting the light beams of automobile headlights on an automobile without employing the beams themselves as orienting media.

Most headlight aimers or testers heretofore proposed have accomplished the desired results by utilizing the output of the light and the pattern cast thereby to aim the headlight, either by receiving the information on a photoelectric cell or a calibrated screen and from the information thus received, making the headlight adjustment. Other devices have heretofore been proposed employing mechanical or geometrical means, as opposed to employing the light beam or pattern thereof. However, such prior devices were cumbersome, inconvenient to operate, and were inaccurate.

One of the important features of the present invention resides in a headlight aimer or tester which is simple in operation, can be quickly and conveniently employed, is extremely accurate and is relatively inexpensive to construct.

Another important feature of the present invention resides in means for standardizing the device to an uneven or sloping floor upon which the automobile may rest whereby the headlights may be adjusted in an absolute sense relative to the automobile independent of the supporting surface which carries the vehicle during the test.

Other objects and advantages of the present invention will be apparent from the accompanying drawings and following detailed description.

In the drawings:

Fig. 1 is a top plan view of the improved headlight aimer comprising the embodiment of the present invention.

Fig. 2 is a side elevational view, parts being broken away and parts being shown in section, of the device illustrated in Fig. 1.

Fig. 3 is an enlarged detailed sectional view taken on the line 3—3 of Fig. 2.

Fig. 4 is an enlarged detailed sectional view taken on the line 4—4 of Fig. 2.

Fig. 5 is a transverse sectional view taken on line 5—5 of Fig. 2.

Fig. 6 is a detailed elevational view, partly in section, of the device mounted upon a headlight, the lens of which carries integral abutment lugs.

Fig. 7 is a view similar to Fig. 6 showing the device mounted upon a headlight, the lens of which is plain.

Fig. 8 is an elevational view of a standard-supported target employed in the invention.

Fig. 9 is a detailed view of the double-faced target shown in Fig. 8.

Fig. 10 is an elevational view showing employment of the invention to standardize or compensate the device for the floor or support level.

Fig. 11 is a top plan view showing the device mounted upon a headlight in cooperative relation to the target carried by the companion headlight.

Referring in detail to the drawings, 1 indicates generally the headlight aim tester embodying the concepts of the present invention. The tester 1 comprises a frame which consists essentially of a mounting portion 2 and a relatively elongated extended frame portion 3. In general, the mounting portion 2 is adapted to secure the instrument 1 in proper relationship upon an automobile headlight and the elongated frame portion 3 is adapted to carry the various instrumentalities for making the test, as will be hereinafter more fully described.

The mounting portion 2 comprises essentially three radially extending circumferentially spaced legs 4 which radiate at angles of 120° from a hub portion 5. The ends of the arms 4 are machined to provide abutment surfaces 6 which, when testing headlights of a specific character, bear upon the outer edge of the headlight lens. At the end portions of each of the arms 4 the abutment pads 6 are undercut to provide a shoulder 7. Certain types of headlight lenses carry integral lugs 8 which are circumferentially spaced adjacent the rim portion of the headlight lens. In testing this type of headlight the lugs 8 integrally formed upon the headlight lens are adapted to abut against the shoulders 7 of the arms 4.

In Fig. 7 the mounting portion of the instrument is shown in its relationship with a headlight, the lens of which is devoid of lugs such as the lugs 8. In Fig. 6 the mounting portion of the instrument is shown in its relationship to a headlight which is provided with the integral lugs 8.

Each of the arms 4 carries a tubular boss 9, the axis of each of which extends at substantially right-angles to the pad portions 6. The outer end of each of the tubular bosses 9 is provided with an aperture 10 through which a rod 11 extends, the rod being freely movable within the aperture. Within the bore of each tubular boss, rod 11 carries a washer 12 which is rigidly secured to the rod. The major portion of the rod 11 within each tubular boss 9 is restricted in diameter and is preferably of rectangular cross-section and at the end portion of the rectangular sectioned rod a hook member 13 is formed. A knob 14 is carried by each of the rods 11 and is employed to conveniently move the rods axially with respect to the tubular boss 9. A coil spring 15 abuts washer 12 and embraces the rectangular sectioned portion of each of the rods 11 and a washer 16 is carried within each tubular boss 9 and is rigidly secured with regard to said boss. The rectangular sectioned portion of each rod 11 extends through an aperture provided in each washer 16.

The arrangement is such that the coil springs in the bosses are normally under compression and tend to urge the rods 11 outwardly with respect to the bosses to their extreme position. However, said rods may be moved inwardly with respect to the bosses and in this fashion the hook portions 11 of said rods may be extended outwardly beyond the abutment pads 6. In outwardly extending the hooks 13 in the fashion described said hooks may be brought into engagement with a bead or bezel 17 formed upon the usual sealed beam headlight indicated generally at 18. Thus, the mounting portion 2 of the instrument may be removably secured to the headlight and may be retained thereon by the urging force of the springs 15. When the mounting portion 2 has thus been secured to the headlight, the axis of the hub 5 is disposed substantially coaxially with respect to the optical axis of the headlight.

The hub 5 is provided with a bore 19 which is adapted to receive a cylindrical end portion 20 of the elongated frame 3. Thus, the frame 3 is mounted upon the holding portion 2 and is immovably secured thereto by means of pin 21 which passes through the hub 5 and the tubular member 20.

The frame 3 is provided with a relatively enlarged aperture 22 and a level-supporting plate 23 is adapted to be positioned over said aperture, the frame 3 being provided with bolt holes 24 through which screws 25 freely project. The level-supporting plate 23 is provided with upwardly extending bosses 26 which are provided with internally threaded apertures 27 into which the screws 25 enter. Resilient washers 28 are interposed between the bottom portion of the level-supporting plate 23 and the frame 3 whereby, by the proper manipulation of screws 24, the plane of the level-supporting plate 23 may be brought into parallelism with the plane of the frame portion 3.

The level-supporting plate 23 is provided with spaced apertures 29 and 29′ into which bushings 30 and 31 are respectively positioned. Bushings 30 and 31 are externally threaded whereby, by means of nuts 32 said bushings may be rigidly secured to the level-supporting plate 23. The bushings 30 and 31 are each internally threaded to receive the threaded shanks, respectively, of adjusting screws 33 and 34. Screw 33 carries at its upper end a disc 35 which is conveniently calibrated, as at 36, in terms of inches rise or fall in a distance of twenty-five feet. Twenty-five feet is the usual distance at which the depression or elevation of a headlight beam is measured. Screw 34 also carries a disc 37 at its upper end which, in turn, carries calibrations 38 on its face, said calibrations being arbitrary to indicate the relative floor elevation upon which the front and rear wheels, of the automobile whose headlights are being tested, rest.

A level bar 39 loosely receives the shanks of screws 33 and 34 and coil springs 40 embrace said shanks beneath said bar, the springs being confined under compression between the bar 39 and the level-supporting plate 23. A conventional spirit level 41 is mounted upon the upper portion of the level bar, being secured to said bar by screws 42.

The outer end portion of the frame 3 carries a ring 43 which is adapted to rotatably receive a sighting tube 44, said ring preferably being integral with the frame and being connected to the body of the frame by ribs 45. The sighting tube is secured against axial movement in ring 43 by a clamping ring 46 which engages in an annular groove provided in the wall of the tube 44. The clamping ring 46 is held substantially flush with the upper surface of frame member 3 and prevents downward movement of the tube 44. A second ring 47 embraces tube 44 beneath the frame 3 and prevents upward axial movement of the tube 44. A radial lug or boss 48 is formed integral with the ring 47 and a set screw 49 is threaded into said lug or boss and functions to rigidly secure the ring upon the tube 44.

The tube 44, at its upper end, carries an eyepiece 50 which is provided with a small diameter elongated aperture 51 disposed coaxially with the axis of the tube 44. Intermediate the length of the tube and beneath the ring 47 a mirror 52 is positioned at an angle of 45° to the line-of-sight from the aperture 51. The mirror 52 is carried upon a bracket 53 which, in turn, is mounted upon the inner wall of the tube. A sight opening 54 is provided in the wall of the tube 44 opposite mirror 52 whereby the line-of-sight from the aperture 51 to mirror 52 is projected through the aperture 54. The mirror 52 carries cross hairs, the intersection of which lies on the line-of-sight from the aperture 51.

As has been hereinbefore mentioned, the tube 44 is rotatable in ring 43 and, hence, the tube 44 may be disposed in a straight-ahead position wherein the projected line-of-sight is parallel to the longitudinal axis of the elongated frame portion 3, or the tube may be rotated in either direction at right-angles thereto. When the tube is rotated to dispose the projected line-of-sight to the right-angle positions the tube may be automatically indexed by the abutment of lug 48 with either of the ribs 45.

A plug 56 (Fig. 4) is positioned in the lower end of tube 44 and is secured therein by pin 57. An arcuate foot 58 is carried by the plug 56 and functions to support the instrument 1 at its end portion upon a suitable supporting surface. In presetting the instrument to adjust it for differences in elevation of a supporting surface or floor upon which the automobile, carrying the headlights under test, rests, the foot 58 functions to support the tube-end of the instrument and a threaded adjusting screw 59 threaded in the lower arm 4 supports the opposite end of the instrument, as will be more clearly described hereinafter.

An auxiliary device 60 (Figs. 8 and 9) is used with the instrument 1 in both adjusting or presetting the instrument for floor level and also in the final checking of the aim of the headlights. The device comprises a rod or standard 61 which is carried by a relatively enlarged resilient suction cup 62. A target structure 63 is carried upon the rod 61 for movement longitudinally thereon, said structure comprising an apertured block 64 which embraces the rod and may be locked in a desired position upon said rod by means of set screw 65. A pair of similar target plates 66 are mounted upon block 64 and each carries an inscribed scale 67 upon one face thereof, the arrangement being such that the scale 67 on the respective faces of the targets may be viewed from either side of the device 60.

In utilizing the present invention, the instrument is first preset for difference in floor level between the portions of the floor upon which the front and rear wheels of the automobile rest. Referring particularly to Fig. 10, the instrument 1 is disposed adjacent the position where one rear wheel of the automobile rests with the attachment portion 2 adjacent the rear side of said rear wheel thus bringing the spirit level in approximate lateral alignment with the center of the rear wheel. The auxiliary device 60 is then positioned laterally adjacent the central portion of the front wheel of the vehicle. The target structure 63 is then positioned upon rod 61 at a height upon said rod which corresponds substantially to the central portion of aperture 54 in tube 44. By adjusting the screw 59 while sighting through aperture 51 in the eyepiece 50 a position of the rear portion of the instrument 1 is reached wherein the zero position of target calibrations 67 is aligned with the horizontal cross hair 55 of mirror 52. This results in disposing the longitudinal axis of the elongated frame portion 3 substantially parallel to the contour of slope line of the floor. Then with disc 35 set to its zero position with respect to index 68 formed upon a lug 26, disc 37 is rotated until the bubble of the spirit level is at its center position. Level bar 39 is thus set on a line which makes an angle with the axis of the frame portion 3 equal to the angle made by the longitudinal axis of the frame portion 3 to the horizontal.

The instrument 1 is then mounted upon the headlight adjacent the side of the automobile upon which the floor level was ascertained, the instrument being secured to the headlight in the manner hereinbefore described and as best illustrated in Figs. 2 and 11. The auxiliary device 60 is then mounted upon the opposite headlight by disposing the vacuum member 62 in suction relationship upon the headlight lens. The rod 61 then extends outwardly from the headlight along a line substantially coaxial with optical axis of the headlight, as best illustrated in Fig. 11. The target structure 63 may then be disposed opposite a scribed index line 61′ upon rod 60 (Fig. 10) which is at a predetermined distance from the headlight substantially equal to the distance between the opposite headlight and the axial center line of the tube 44 of instrument 1.

The tube 44 is then rotated to a right-angle position so that the opening 54 in the tube faces the target 66. The headlight carrying the instrument 1 is adjusted so that the line of sight through the aperture 51 coincides with the cross hairs of the mirror and the zero line on target 66. This aims the light horizontally and positions it parallel to the longitudinal axis of the vehicle being tested. The disc 35 is adjusted to a desired predetermined calibration such as to indicate the desired depression of the headlight beam at twenty-five feet distance, for instance, the index 68 may indicate the calibration 2 on that side of zero which raises the outer end of level bar 39, thereby setting the instrument for a depression of the beam of two inches in twenty-five feet. The headlight carrying the instrument is then adjusted vertically until the bubble in spirit level 41 shows level. This aims the headlight vertically. The desired horizontal and vertical alinement of the headlight upon which the instrument is carried is thus made.

The operation, hereinbefore described, is then repeated for the opposite headlight, that is, the instrument is preset to correct for floor level adjacent the wheels on the opposite side of the vehicle and is subsequently mounted on the uncorrected headlight with the auxiliary device mounted upon the corrected headlight.

Many modifications of the present invention may be made by those skilled in the art which do not depart from the spirit of the invention and, hence, it is not intended that the invention be limited to the precise details shown and described except as necessitated by the appended claims.

I claim as my invention:

1. A device for testing the aim of automobile headlights which comprises, a frame having a relatively elongated portion, a sighting tube carried at one end of the elongated frame portion with its axis at substantially right-angles to the longitudinal axis of said elongated frame portion, a spirit level carried by said elongated frame portion, means carried by said sighting tube for projecting a line of sight at substantially right-angles to the axis of said tube, a foot carried at one end of said sighting tube for contact with the surface of a supporting floor, adjusting screw means carried at the opposite end portion of said elongated frame portion and spaced from said foot for disposing said frame parallel with the surface of a supporting floor upon which an automobile having headlights rests, means carried by said frame and bearing on one end of said spirit level for canting said spirit level to center the bubble therein while the frame is parallel with said floor, means for securing said frame with the preset level to a headlight of said automobile to dispose the longitudinal axis of said frame substantially coaxially with respect to the optical axis of said headlight, means carried by said frame and bearing upon the opposite end of said spirit level to cant said level a predetermined degree from its preset position, and target means adapted to be carried by the opposite headlight upon which the line of sight from said tube is oriented whereby the headlight carrying said frame may be adjusted to cause coincidence between the line of sight and a predetermined portion of said target.

2. A device for testing the aim of automobile headlights which comprises, a frame having a relatively elongated portion, a sighting tube carried at one end of the elongated frame portion with its axis at substantially right-angles to the longitudinal axis of said elongated frame portion, a level bar carried by said elongated frame portion, a spirit level mounted on said bar, means carried by said sighting tube for projecting a line of sight at substantially right-angles to the axis of said tube, means carried at the opposite end portion of said elongated frame portion for disposing said frame parallel with the surface of a supporting floor upon which an automobile having headlights rests, means carried by said frame and one end portion of said level bar for canting said level bar to center the bubble of the spirit level while the frame is parallel with said floor, means for securing said frame with the preset level to a headlight of said automobile to dispose the longitudinal axis of said frame substantially coaxially with respect to the optical axis of said headlight, means carried by said frame and the opposite end of said level bar to cant said level bar a predetermined degree from its preset position, and target means adapted to be carried by the opposite headlight upon which the line of sight from said tube is oriented whereby the headlight carrying said frame may be adjusted to cause coincidence between the line of sight and a predetermined portion of said target, said target means comprising a rod, means carried at one end of the rod for securing said rod to the opposite headlight, and a target movably carried by said rod for disposition a predetermined distance from said headlight.

3. A device for testing the aim of automobile headlights which comprises, a frame having a relatively elongated portion, a sighting tube carried at one end of the elongated frame portion with its axis at substantially right-angles to the longitudinal axis of said elongated frame portion, a level bar carried by said elongated frame portion, a spirit level mounted on said bar, means carried by said sighting tube for projecting a line of sight at substantially right-angles to the axis of said tube, means carried at the opposite end portion of said elongated frame portion for disposing said frame parallel with the surface of a supporting floor upon which an automobile having headlights rests, calibrated screw means carried by said frame and one end portion of said level bar for canting said level bar to center the bubble of the spirit level while the frame is parallel with said floor, means for securing said frame with the preset level to a headlight of said automobile to dispose the longitudinal axis of said frame substantially coaxially with respect to the optical axis of said headlight, calibrated screw means carried by said frame and the opposite end of said level bar to cant said level bar a predetermined degree from its preset position, and target means adapted to be carried by the opposite headlight upon which the line of sight from said tube is oriented whereby the headlight carrying said frame may be adjusted to cause coincidence between the line of sight and a predetermined portion of said target, said target means comprising a rod, a vacuum cup carried at one end of the rod for securing the rod to the lens of the opposite headlight, and a target movably carried by said rod for disposition upon said rod a predetermined distance from said supporting headlight lens.

References Cited in the file of this patent

UNITED STATES PATENTS

| | | |
|---|---|---|
| 2,003,797 | Arbuckle | June 4, 1935 |
| 2,028,430 | Baddorf et al. | Jan. 21, 1936 |
| 2,144,838 | Falge | Jan. 24, 1939 |
| 2,337,502 | Scott et al. | Dec. 21, 1943 |
| 2,411,879 | Holmes | Dec. 3, 1946 |
| 2,755,554 | McMillan | July 24, 1956 |
| 2,778,267 | Miller | Jan. 22, 1957 |
| 2,797,494 | Irwin | July 2, 1957 |

FOREIGN PATENTS

| | | |
|---|---|---|
| 589,362 | Great Britain | June 18, 1947 |